(No Model.)

J. P. HARPER.
TRUCK.

No. 536,282.                           Patented Mar. 26, 1895.

Witnesses:
F. G. Fischer
J. H. Pinkman

Inventor
James P. Harper
By Rich H. Manning Atty.

UNITED STATES PATENT OFFICE.

JAMES P. HARPER, OF WESTPORT, MISSOURI.

TRUCK.

SPECIFICATION forming part of Letters Patent No. 536,282, dated March 26, 1895.

Application filed October 4, 1893. Renewed February 19, 1895. Serial No. 539,011. (No model.)

*To all whom it may concern:*

Be it known that I, JAMES P. HARPER, a citizen of the United States, residing at Westport, in the county of Jackson and State of Missouri, have invented certain new and useful Improvements in Trucks; and I do hereby declare that the following is a full, clear, and exact description of the invention, such as will enable others to make and use the same, reference being had to the accompanying drawings, forming a part of this specification.

The object of my invention is, first, to enable the truck frame to encompass the weight to be moved, and the platform moved beneath the weight; second, to raise and lower a weight upon a truck within the limits of the truck frame.

My invention further consists in the novel construction and combination of parts such as will first be fully described and specifically pointed out in the claims.

Figure 1:
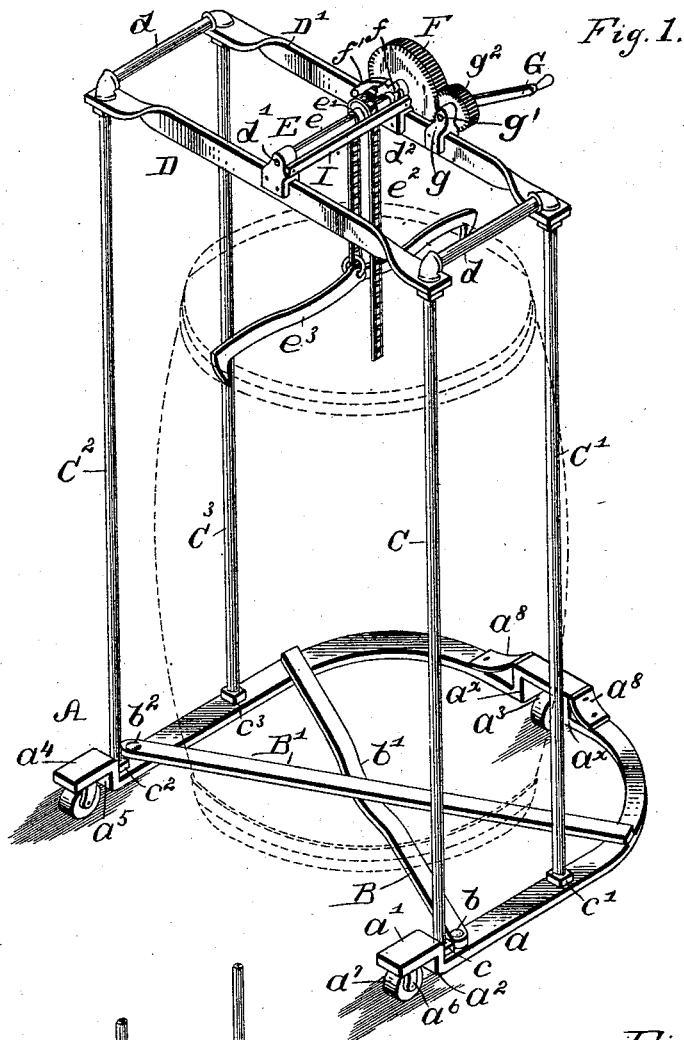
Figure 2:
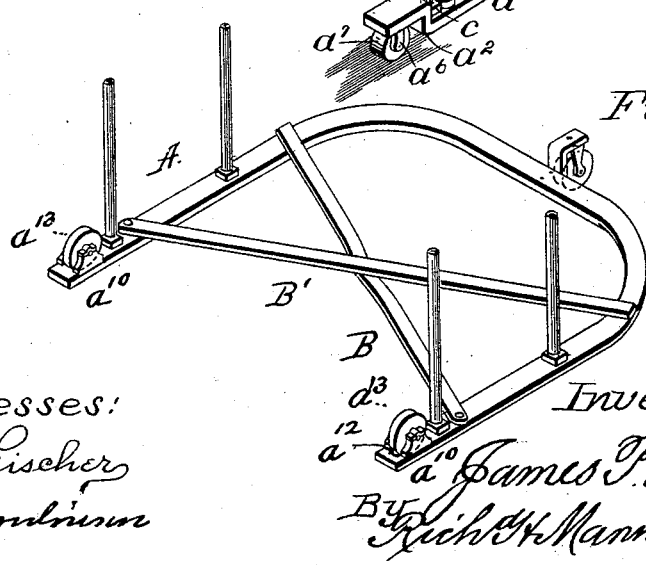

In the drawings:—Figure 1. is a view in perspective of my improved truck showing the elevator, and in dotted lines the weight raised above the floor and supported by the movable platform. Fig. 2. is a detail view of the lower portion of the truck frame, showing the raised journal boxes.

Similar letters of reference indicate corresponding parts in both figures.

In the construction of my improved truck, I first make a movable yoke frame A. which is composed of a flat bar $a$, of the proper length and comparatively narrow in width. A portion $a^2$ of one end of bar $a$, is bent upwardly at right angles to the said bar and at a point on said portion $a'$, the requisite distance from the said bar $a$, the remainder of portion $a'$, is bent at right angles in a plane parallel with the said bar, thus forming a recess $a^2$. Equi-distant from the ends of bar $a$, a depression or recess $a^3$, is formed in the bar of the same length as the recess $a^2$, the sides $a^\times$, $a^\times$, of which are bent upwardly at right angles to the said bar, and equal in height to the side of the bar forming the recess $a^3$. The other end $a^4$, of the bar $a$, is bent at an angle in the same manner as the portion $a'$, and a recess $a^5$, formed thereby in a similar manner as described by the recess $a^2$. The bar $a$, is then bent in an outwardly curved line in opposite direction from the recess $a^3$, in a plane in the direction of one longitudinal edge of said bar and with both ends $a'$, $a^4$, of said bar, extending in the same direction and parallel with each other.

To the under side of the portion $a'$, of the bar $a$, in the recess $a^2$, is attached the upper ends of a forked journal plate $a^6$, between which plates is journaled a wheel $a^7$, the periphery of which wheel extends a slight distance below the under side of the under side of the bar $a$. To the under side of the portion $a^4$, of bar $a$, in the recess $a^5$, is attached a forked lug which is similar to the lug $a^6$, and in which is journaled a wheel similar to the wheel $a^7$.

To the under side of bar $a$, in the recess $a^3$, is a similar wheel to that described, the forked lug supporting said wheel being attached to the bar as described in the recess $a^2$. On each side of the angular portions $a^\times$, $a^\times$, of the bar $a$, which form the sides to the recess $a^3$, are inserted the triangular shaped blocks $a^8$, $a^8$, for the purpose hereinafter described.

The platform of the truck consists of separate movable bars B. B'. One of said bars B. is pivotally attached at $b$, to the upper side of bar $a$, on one side of frame A. at a point in rear of the angle formed by the bent portion $a'$, of said bar, and the other movable end made to extend in length to the other side of the said frame at an angle to the end portion $a'$, of the bar $a$, and rest upon the upper side of said bar. In bar B. between its ends is made a curved depression $b'$. To the upper side of the bar $a$, and upon the other side of frame A. near the angle formed by the bent portion or end $a^4$, of said bar, is pivotally attached at $b^2$, one end of a bar B'. the other movable end of which bar is extended across bar B. in the depression $b'$, and to the other side of the frame A. and rests upon the upper side of said bar $a$.

To the upper side of bar $a$, between the angle formed by the portion $a'$, of bar $a$, and the pivotal point $b$, of the bar B. is attached rigidly a threaded nut $c$. A considerable distance from the nut $c$, in the direction of the recess $a^3$, and upon the upper side of the bar $a$, is attached rigidly a threaded nut $c'$. Upon the other side of the frame A. and upon the upper side of bar $a$, in line transversely with the respective nuts $c$, $c'$, are secured the threaded nuts $c^2$, $c^3$. In the nuts $c$, $c'$, are fitted the lower ends of the separate rods or standards C. C'. which extend upwardly the proper distance for the elevation of weights of various heights. In the nuts $c^2$, $c^3$, are also fitted the lower ends of similar separate standards $C^2$, $C^3$, which also extends the same heights as the rods C. C'.

To the upper end of rod C. is attached flatwise one end of a flat bar D. the other end of which bar is attached to the upper end of the rod $c^2$, extending upwardly from the other side of the frame A. The bar D. is then twisted so as to bring the outer edge in a horizontal position. To the upper end of the rod C'. is attached flatwise a bar D'. the other end of which bar is attached to the upper end of the rod $C^3$. The outer edge of bar D'. is also placed in the same position as the outer edge of the bar D. To the end of bar D. on rod C. is attached a connecting brace rod $d'$, the other end of which brace is attached to the end of the bar D'. on rod C'. A similar brace rod is also connected with the other ends of the bars D. D'. on the rods $C^2$. $C^3$.

On the bars D. D'. equi-distant from the brace rods $d$, $d$, are mounted journal bearings $d'$, $d^2$, in which is journaled in a transverse direction to the bars D. D'. a rotating shaft E. On shaft E. extending nearly its length between the bars D. D'. is a feather $e$. Upon the shaft E. is keyed so as to move in the direction of said shaft, a sprocket wheel $e'$. One end of shaft E. is extended beyond the journal box $d^2$, on bar D'. and the outer side of said bar, and upon said end of said shaft is mounted fixedly a gear wheel F. which is larger in diameter than sprocket wheel $e'$. On the shaft E. near the bar D'. is a ratchet wheel $f$, and on the side of said bar is a pawl $f'$, engaging with said ratchet wheel. On the bar D. near the gear F. is attached a journal bearing $g$. In the bearing $g$, is attached a spindle $g'$, upon which is a spur wheel $g^2$, which meshes with the gear F. on shaft E.

To the spindle $g'$, of the gear $g^2$, is attached a crank G. Over the sprocket wheel $e'$, is placed a sprocket chain $e^2$, both ends of which chain extend downwardly as far as required and upon one end of said chain is a grappling hook $e^3$. Attached at one end to one journal bearing $d$, on the bar D. is a retaining bar I. the other end of which bar passes close in position to the sprocket chain $e^2$, on the sprocket wheel $e'$, and is attached to the side of the journal bearing $d'$, on the bar D'.

In the operation of my improved truck, the bars B. B'. which form the movable platform are moved at one end over the angular portion of frame $a$, above the recess $a^3$, and placed nearly in line with the sides of the frame A. the inclined surfaces of the blocks $a^8$, $a^8$, permitting the obstruction caused by the sides of the said recess to be readily passed. The bar $a$, which forms the frame A. of the truck, it will be observed, is raised in position a slight distance from the floor or ground, this depression of the frame being obtained by the recessed portions of the bar as before explained. The truck frame with its elevator is then advanced toward the object or weight to be moved and the sides of the frame pass on each side of the weight or other object thus bringing the weight directly beneath the elevating devices and within the base of the truck and the center of gravity of the elevating frame. For this instance I show a cask within the limits of the truck frame. The grappling hooks $e^3$, on the end of the sprocket chain $e^2$, are shown placed over the chains and on both sides of the cask, and the cask is elevated by the power applied to crank G. the desired height, above the level of the frame A. of the truck, the guide bar I. serving to retain the grasp of the sprocket chain with the teeth of the sprocket wheel. In this position of the cask the frame, engages with the ratchet wheel $f$, and the cask is suspended in position. The movable ends of the bars B. B'. are drawn over the rear recessed end of the frame A. and beneath the cask and folded into the position as seen in Fig. 1. The pawl $f'$, is then raised from the ratchet wheel and supported by the power on the crank G, the cask is lowered and rests upon the movable platform, and the truck moved to the desired place. The depression of the truck frame may be afforded in another manner as seen in Fig. 2. in which the journal boxes $a^{10}$, are arranged upon the truck frame so as to extend above the upper surface of said frame. In this construction I make a slot $a^{12}$, in the frame A. and extend the journal bearings $a^{10}$, for the wheels $a^{13}$, above the sides of the slot as far as required, thus enabling me to use a wheel of large diameter and with a depressed rigid truck frame or platform free from oscillation.

Having fully described my invention, what I now claim as new, and desire to secure by Letters Patent, is—

1. In a truck having a removable platform, a yoke frame supporting said platform, substantially as and for the purpose described.

2. In a truck consisting of a movable yoke frame, a folding platform, substantially as and for the purpose described.

3. In a truck having a removable platform, a yoke frame, elevator supports upon said frame, and an elevator upon said supports within the center of gravity of said supports and the base of said yoke frame, substantially as described.

4. In a truck consisting of a yoke frame, a platform consisting of separate bars pivoted to the respective sides of said yoke frame at one end and having their outer ends folded and supported by said frame, as shown and described.

5. In a truck having a depressed frame and suitable platform, the combination of journal boxes connected with said frame and extending above the said platform, and wheels journaled in said boxes, as and for the purpose described.

JAMES P. HARPER.

Witnesses:
S. L. C. HASSON,
H. R. TOMLINSON.